US008584514B2

(12) United States Patent
Tecza et al.

(10) Patent No.: US 8,584,514 B2
(45) Date of Patent: Nov. 19, 2013

(54) AXIAL LOADING DEVICE AND METHOD FOR MAGNETICALLY-SUPPORTED ROTOR SYSTEMS

(75) Inventors: Joseph A. Tecza, Scio, NY (US); Scott M. Hanaka, Wellsville, NY (US); Bruce E. Fuller, Alfred Station, NY (US)

(73) Assignee: Dresser-Rand Company, Olean, NY (US)

( * ) Notice: Subject to any disclaimer, the term of this patent is extended or adjusted under 35 U.S.C. 154(b) by 182 days.

(21) Appl. No.: 13/107,334

(22) Filed: May 13, 2011

(65) Prior Publication Data

US 2012/0192631 A1   Aug. 2, 2012

Related U.S. Application Data

(60) Provisional application No. 61/345,937, filed on May 18, 2010.

(51) Int. Cl.
*G01M 15/14*   (2006.01)

(52) U.S. Cl.
USPC ............................................. 73/112.01

(58) Field of Classification Search
USPC ............... 73/112.01, 112.02, 112.03, 112.05
See application file for complete search history.

(56) References Cited

U.S. PATENT DOCUMENTS

| | | | |
|---|---|---|---|
| 7,963,160 B2 * | 6/2011 | Bisgaard | 73/170.01 |
| 8,006,544 B2 * | 8/2011 | Holmes et al. | 73/112.01 |
| 8,191,410 B2 * | 6/2012 | Hansen et al. | 73/112.05 |
| 2008/0095609 A1 * | 4/2008 | Block et al. | 415/30 |
| 2008/0101918 A1 * | 5/2008 | Block et al. | 415/30 |
| 2008/0115570 A1 * | 5/2008 | Ante et al. | 73/114.77 |
| 2009/0173148 A1 * | 7/2009 | Jensen | 73/116.03 |

* cited by examiner

*Primary Examiner* — Eric S McCall
(74) *Attorney, Agent, or Firm* — Edmonds & Nolte, PC

(57) ABSTRACT

Apparatus and methods for testing a turbomachine, with the apparatus including a loading device housing, a disk, and a non-contacting seal. The loading device housing has an inner surface and a fluid inlet configured to receive a pressurized gas. The disk is located outside of a turbomachine housing in which the turbomachine is disposed and is coupled to a shaft of the turbomachine, proximal an axial end of the shaft. The disk is received in the loading device housing and is axially moveable in the loading device housing while the shaft is rotating. The non-contacting seal is disposed between the inner surface and the disk.

12 Claims, 5 Drawing Sheets

AXIAL LOADING DEVICE AND METHOD FOR MAGNETICALLY-SUPPORTED ROTOR SYSTEMS

CROSS-REFERENCE TO RELATED APPLICATIONS

This application claims priority to U.S. Provisional Application having Ser. No. 61/345,937, filed May 18, 2010. This priority application is hereby incorporated by reference in its entirety into the present application, to the extent that it is consistent with the present application.

BACKGROUND

Turbomachine shafts are typically supported against radial and axial loads with bearings. One type of bearing is a magnetic bearing, which supports the shaft by levitating it magnetically. Magnetic bearings are typically used to avoid friction losses and lubrication requirements of more conventional bearings. Auxiliary bearings may be provided along with the magnetic bearings and may be configured to catch the shaft in the event of a magnetic bearing failure, i.e., a "drop." This allows the shaft to coast down to a stop, thereby minimizing wear and/or damage to the turbomachine caused by the drop. The auxiliary bearings may otherwise remain idle during normal turbomachine operation.

Magnetic bearings are typically controlled by a position feedback control loop, which receives information about the position of the shaft from position sensors and responds by altering the electrical current supplied to the magnetic bearings. This changes the strength of the magnetic field supporting the shaft, which in turn then controls the position of the shaft. Typically, the magnetic bearings and their associated feedback control loops require tuning to account for vibrations in the turbomachine support structure; otherwise, the feedback control loop may treat the vibration of the turbomachine support structure as position changes in the shaft instead of in the support structure. If the feedback control loop misinterprets the movement in this manner, the feedback control loop may react by attempting to move the shaft in phase with the vibrations in the support structure. This may compound the vibration of the support structure, potentially leading to destructive conditions.

Additionally, if the magnetic bearings drop the shaft, the auxiliary bearings are required to support axial loads up to or greater than the maximum operational thrust force of the turbomachine. For example, should the magnetic thrust bearings cease to operate, the auxiliary bearings must support the load that was supported by the magnetic thrust bearing, until the turbomachine is tripped or shut down. If external loads such as surge in a compressor exceed the capacity of the magnetic thrust bearing, then the auxiliary bearing must carry that additional load as well. Accordingly, it is desirable to test thrust bearings to their rated load capacities during operation of a test rig or the actual rotating machine, and not just under static non-rotating conditions.

Applying test loads to a rotating shaft while the shaft is magnetically suspended without affecting tuning accuracy, however, can present a challenge. One reason such loading is challenging is that conventional mechanical loading devices add a combination of mass, stiffness, and damping to the shaft. This may disrupt the aforementioned tuning of the magnetic bearings and may necessitate iterative changes to the tuning after assembly. Tuning of magnetic bearings, however, is a complex procedure because magnetic bearings are sensitive actuators that combine high-frequency response and high-force capability. Poorly-designed loading devices can change the frequency characteristics of the turbomachine to such an extent that an impracticably large number of modifications to the control algorithms are required to bridge the gap between the test conditions and conditions present in the final, assembled turbomachine deployed into the field.

What is needed, therefore, is a reliable loading method and apparatus that minimizes the tuning gap between the test assembly and the actual assembly.

SUMMARY

Embodiments of the disclosure may provide an exemplary apparatus for testing a turbomachine, including a loading device housing, a disk, and a non-contacting seal. The loading device housing has an inner surface and a fluid inlet configured to receive a pressurized gas. The disk is located outside of a turbomachine housing in which the turbomachine is disposed and is coupled to a shaft of the turbomachine, proximal an axial end of the shaft. The disk is received in the loading device housing and is axially moveable in the loading device housing while the shaft is rotating. The non-contacting seal is disposed between the inner surface and the disk.

Embodiments of the disclosure may also provide an exemplary method for testing a turbomachine. The exemplary method includes levitating a shaft of the turbomachine with a magnetic bearing, and encircling the shaft with an auxiliary bearing such that the shaft is free from contact with the auxiliary bearing while the shaft is levitated by the magnetic bearing. The exemplary method may also include tuning the magnetic bearing, and applying an axial load on the shaft using a pressurized floating pneumatic piston. The exemplary method further includes de-levitating the shaft while applying the axial load to test the auxiliary bearing.

Embodiments of the disclosure may further provide an exemplary turbomachine test stand, including a turbomachine, a loading device housing, a disk, a non-contacting seal, and a fluid inlet. The turbomachine includes a turbomachine housing, a shaft extending at least partially through the turbomachine housing and outward therefrom, a magnetic bearing supporting the shaft during normal operation, and an auxiliary bearing supporting the shaft during a drop. The loading device housing defines an interior. The disk is coupled to the shaft, with the disk being received in the interior of the loading device housing. The non-contacting seal is disposed between the loading device housing and the disk. The fluid inlet communicates with the interior of the loading device housing.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
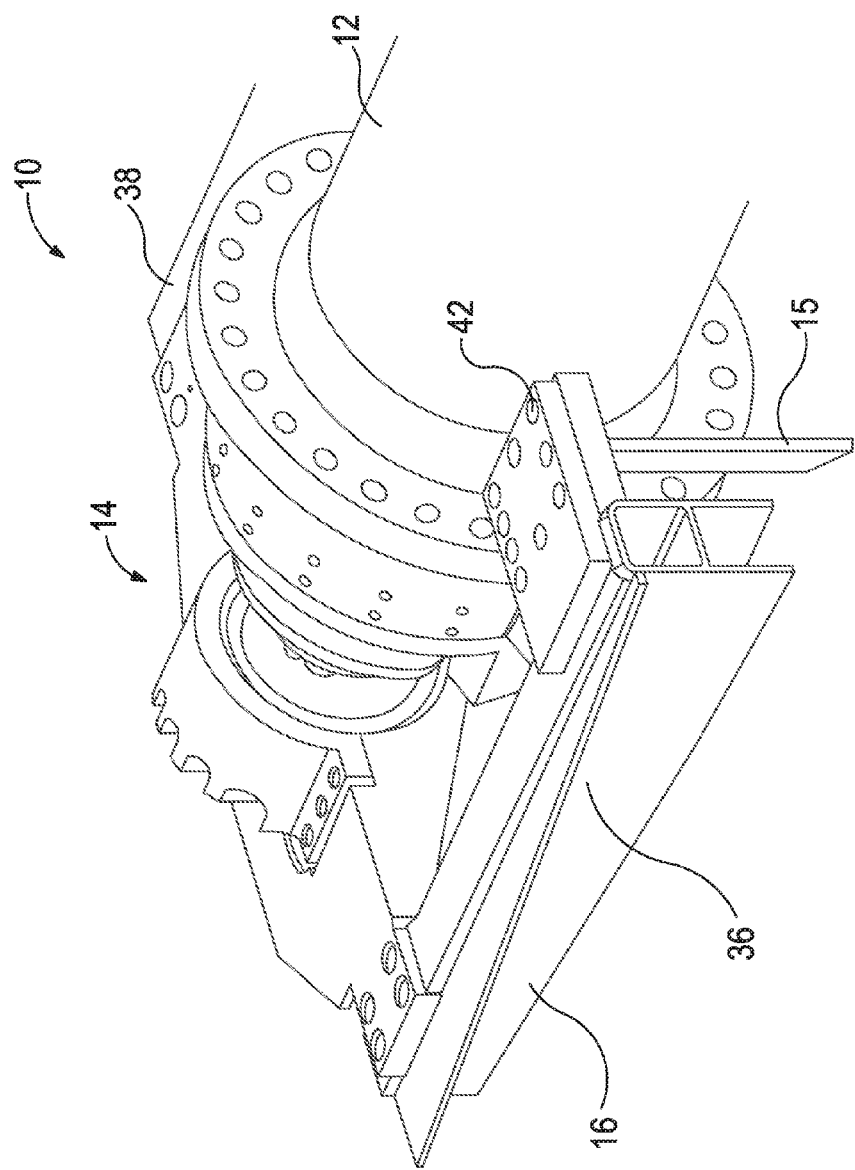
FIG. 1 illustrates a perspective view of an exemplary turbomachine test stand, according to one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a perspective view of an exemplary turbomachine test stand 10. The test stand 10 generally includes a turbomachine housing 12, in which a turbomachine (not shown) is disposed, and an axial loading device 14. In various exemplary embodiments, the turbomachine 12 may be a centrifugal compressor, any type of turbine including a steam or gas turbine, a separator, a pump, or the like. In FIG. 1, the shaft of the turbomachine 12 is not viewable; however, as will be described below and shown in subsequent figures, a shaft extends from within the turbomachine housing 12 to the axial loading device 14. Furthermore, the test stand 10 includes a turbomachine support structure 15, which supports and maintains the position of the turbomachine housing 12 during testing. The axial loading device 14 may also include a loading support structure 16, which may be coupled to the turbomachine support structure 15 such that the axial loading device 14 remains stationary with respect to the turbomachine housing 12.

Figure 2:
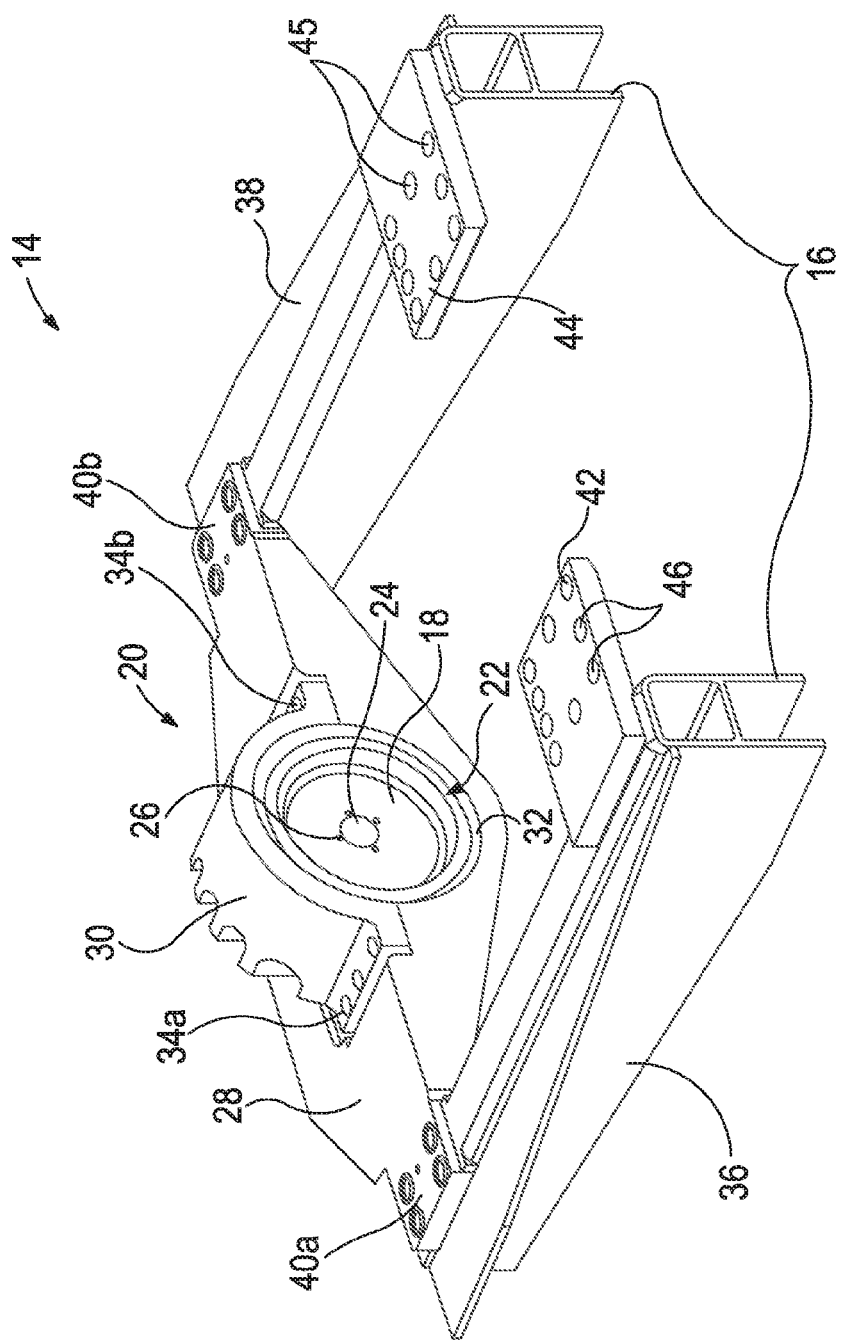
FIG. 2 illustrates a perspective view of an exemplary axial loading device, according to one or more aspects of the disclosure.

With continuing reference to FIG. 1, FIG. 2 illustrates a perspective view of the axial loading device 14, with the turbomachine housing 12 removed for illustrative purposes. As shown, the axial loading device 14 may include a disk 18 and a loading device housing 20, with the disk 18 inserted into an open end 22 of the loading device housing 20. The disk 18 may be made of a light-weight material, such as aluminum, an alloy thereof, or the like. Furthermore, the disk 18 may include a hub 24, which may be integral with or coupled to the disk 18 and disposed at the approximate radial middle of the disk 18. Although not shown, the hub 24 is connectable to the shaft of the turbomachine, as will be described in greater detail below. Furthermore, the hub 24 may include one or more bore holes 26, which may or may not be threaded, with the bore holes 26 configured to receive mechanical fasteners, such as bolts, to couple the disk 18 to the shaft. It will be appreciated, however, that the hub 24 may be connectable to a shaft using any other suitable process or device. In various other embodiments, the hub 24 may be omitted, with the disk 18 connectable to a shaft using any other coupling and/or connecting processes and devices.

The loading device housing 20 may include a transversely-extending base 28 and a top 30. The base 28 may include an arcuate recessed section 32. The arcuate recessed section 32 may extend partially around the disk 18 when the disk 18 is inserted into the open end 22, for example, the arcuate recessed section 32 may extend approximately 180 degrees around the disk 18. The top 30 may also be generally arcuate in shape and may also extend approximately 180 degrees around the disk 18. Additionally, the top 30 may include flanges 34a,b, with the top 30 secured to the base 28 by fastening, welding, or otherwise coupling the flanges 34a,b to the base 28. It will be appreciated, however, that other devices and processes for coupling the top 30 to the base 28 may be employed without departing from the scope of this disclosure. In an exemplary embodiment, the top 30 and the arcuate recessed section 32 of the base 28 may form a cylinder providing the open end 22 of the loading device housing 20. It will be appreciated that the relative positioning between the top 30 and the arcuate recessed section 32 is exemplary, and that, in other exemplary embodiments, the "top" 30 may provide the bottom, side, top, or a combination thereof for the loading device housing 20. Furthermore, the top 30 may include multiple arcuate or otherwise shaped segments, which may be coupled together by any suitable device and/or process. Additionally, the top 30 and the base 28 may be integrally-formed, for example, by casting or by milling from a single workpiece.

The loading support structure 16 of the axial loading device 14 may include one or more support arms, for example, support arms 36 and 38. The support arms 36, 38 may be coupled to the base 28, for example, using dovetailed and/or flange connections 40a, 40b and may extend orthogonally from the base 28 toward the turbomachine support structure 15 (FIG. 1). In various exemplary embodiments, however, the support arms 36, 38 may be coupled to the loading device housing 20 using any suitable coupling process and/or device or may be integrally-formed therewith. Although not shown, the support arms 36, 38 may be coupled to the base 28 at any acute or obtuse angles, for example, at acute angles such that the support arms 36, 38 may extend toward each other, and, for example, may form a triangular truss-type structure.

Additionally, the support arms 36, 38 may each include one or more connecting plates, for example, connecting plates 42 and 44, respectively. The connecting plates 42, 44 may each include bore holes 46, 45, respectively, as shown, for receiving mechanical fasteners to couple the axial loading device 14 to the turbomachine support structure 15, as shown in FIG. 1. In other exemplary embodiments, the connecting plates 42, 44 may omit the bore holes 45, 46 and/or may be otherwise coupled to the turbomachine support structure 15 such as by welding, brazing, or the like. Furthermore, it will be appreciated that the support arms 36, 38 may be coupled to the turbomachine support structure 15 or another structure using any coupling device or process without departing from the scope of this disclosure. Additionally, the support arms 36, 38 may be disposed at about the same vertical level as the hub 24, i.e., at the vertical center of the turbomachine housing 12 (FIG. 1). Disposing the support arms 36, 38 orthogonally to the base 28 and at the same vertical level as the hub 24 may prevent the support arms 36, 38 from transmitting unintended radial and/or axial loads or moments, and thus vibration, to the turbomachine support structure 15.

Figure 5:
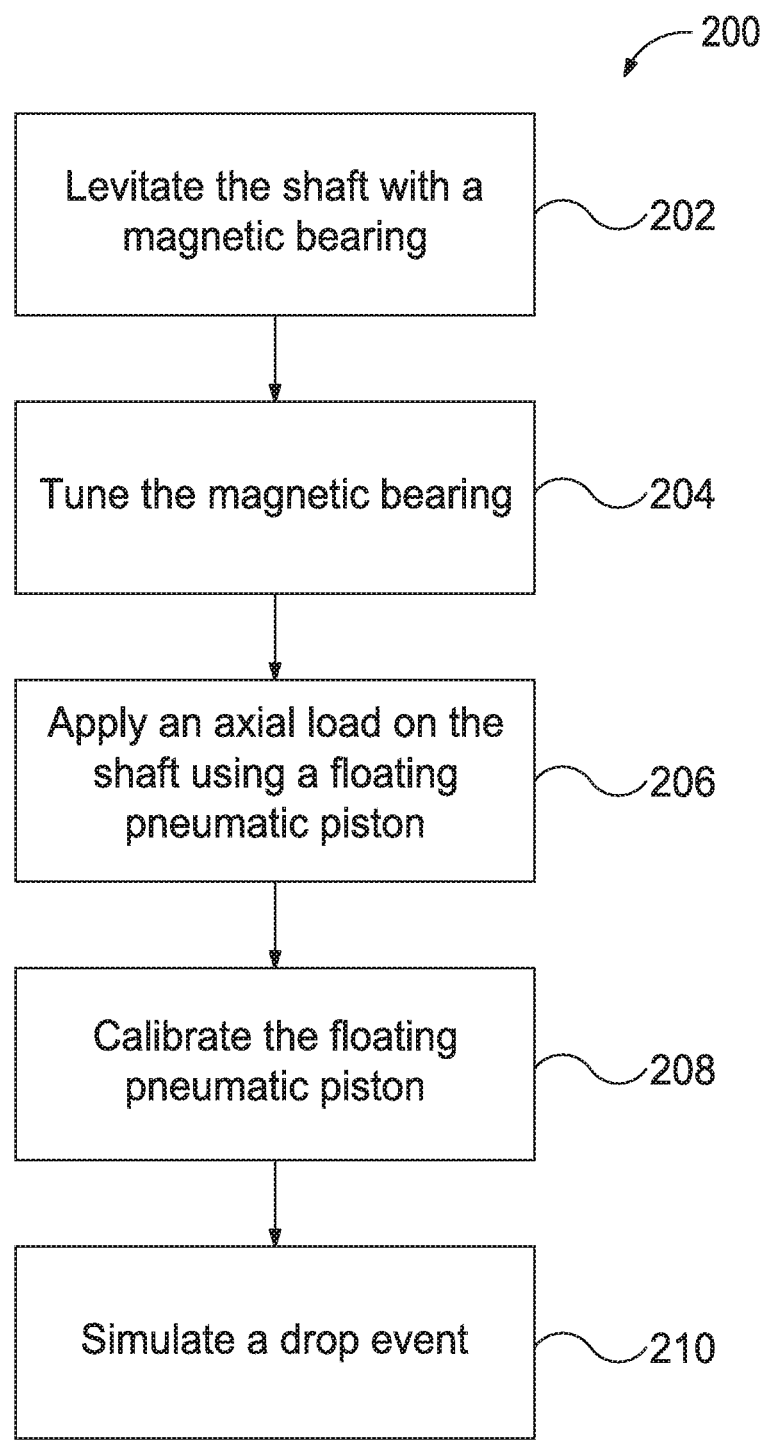
FIG. 5 illustrates a flow chart of an exemplary method for testing a turbomachine, according to one or more aspects of the disclosure.

Further, one or more additional support braces, e.g., diagonally-disposed plates, arms, or other structural support members (not shown), may be coupled to each of the support arms 36, 38 and extend to the turbomachine housing 12 or other generally rigid member. Such additional support braces may be configured to provide additional side-to-side or lateral stiffness for the loading support structure 16, thereby controlling vibration in the same direction. Additionally, the turbomachine support structure 15 may include a horizontal base 60 (shown in and described below with reference to FIG. 5), and one or more support braces, arms, plates, or other structural support members (not shown) may extend from the horizontal base 60 (or other generally rigid member) and be coupled with the base 28 and/or one or more of the support arms 36, 38. Such support braces may be configured to provide additional vertical stiffness to the loading support structure 16, thereby controlling vertical vibration of the loading support structure 16.

Figure 3:
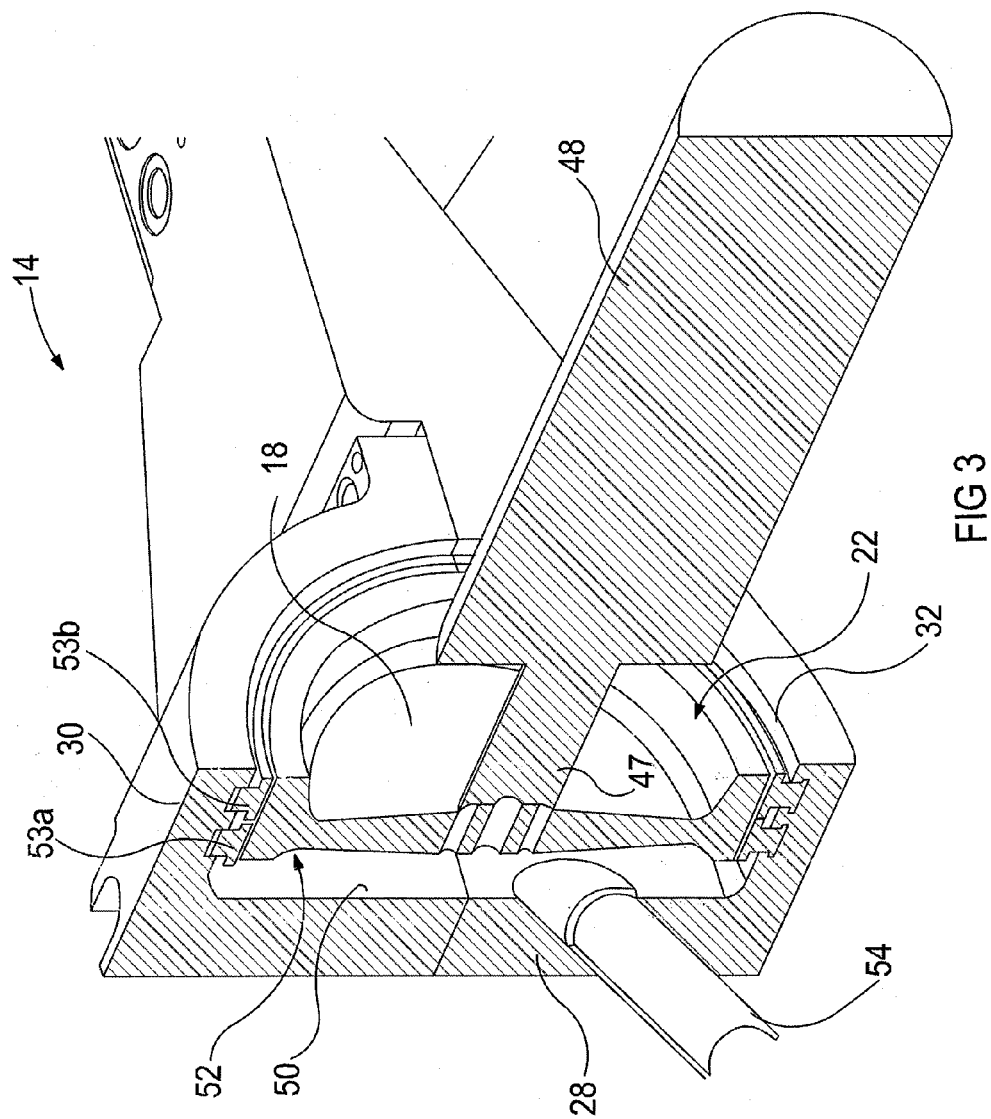
FIG. 3 illustrates a perspective sectional view of the exemplary axial loading device, according to one or more aspects of the disclosure.

FIG. 3 illustrates a perspective view of a cut-away of the axial loading device 14, illustrating the interior of the top 30 and the arcuate recessed section 32 of the base 28. As shown, the disk 18 is received into the open end 22 of the axial loading device 14. Further, the disk 18 may be coupled to a quill shaft 47, which is coupled or otherwise attached to the turbomachine shaft 48; however, in various exemplary embodiments, the disk 18 may be attached directly to the turbomachine shaft 48 or may be coupled to another disk (not shown) disposed around the turbomachine shaft 48 and/or the quill shaft 47. Other coupling methods and/or devices for coupling the disk 18 to the turbomachine shaft 48 may also be used without departing from the scope of this disclosure.

As shown in FIG. 3, opposite the open end 22, the combination of the top 30 and the base 28 may provide a wall 50. A pressurized region 52 may be defined between the wall 50 and the disk 18. Furthermore, one or more seals, for example, seals 53a,b may be coupled to the top 30 and/or the arcuate recessed section 32 and may circumscribe the disk 18, thereby maintaining pressure in the pressurized region 52. In another exemplary embodiment, the seals 53a,b may instead be coupled to the disk 18 such that the seals 53a,b may extend toward, but may stop short of contacting, the top 30 and the arcuate recessed section 32 (i.e., the inner surface of the loading device housing 20). The seals 53a,b may be any type of non-contacting seals, such as labyrinth seals, brush seals, dry gas seals, combinations thereof, or the like. Accordingly, the disk 18 may generally avoid making physical contact with the seals 53a,b and, accordingly, with the top 30 or the base 28 during normal operation.

In at least one exemplary embodiment, the distance between the seals 53a,b and the loading device housing 20 may be determined such that movement of the disk 18 caused by the disengagement of the magnetic bearing 57 from the turbomachine shaft 48 during a drop does not cause the disk 18 to contact the seals 53a,b. For example, the radial center of the seals 53a,b, may be positioned below the radial centerline to accommodate the vertical lowering of the shaft 48, and thus the disk 18, during a drop. In another exemplary embodiment, the seals 53a,b may be compliant seals, such as a brush seals, which may deform to the dislocation of the disk 18 during the drop and spring back thereafter with minimal wear.

Further, a fluid inlet 54, which may be or include one or more pipes, conduits, headers, manifolds, ducts, and/or any other fluid-carrying structures, may be disposed through the wall 50 and may fluidly communicate with the pressurized region 52. Although not shown, the fluid inlet 54 may be coupled to a source of pressurized gas such as a compressor. The pressurized gas may be "shop air," also referred to as shop gas, which is generally known in the art. In various exemplary embodiments, the shop air can be provided having a pressure of from about 50 psi, about 60 psi, or about 70 psi to about 130 psi, about 140 psi, or about 150 psi. In various other exemplary embodiments, however, higher pressure gas may be employed instead of or in addition to shop air. The pressurized gas may be supplied through the fluid inlet 54 to the pressurized region 52, or may be evacuated from the pressurized region 52, and may support operation of the axial loading device 14, as described in greater detail below.

Figure 4:
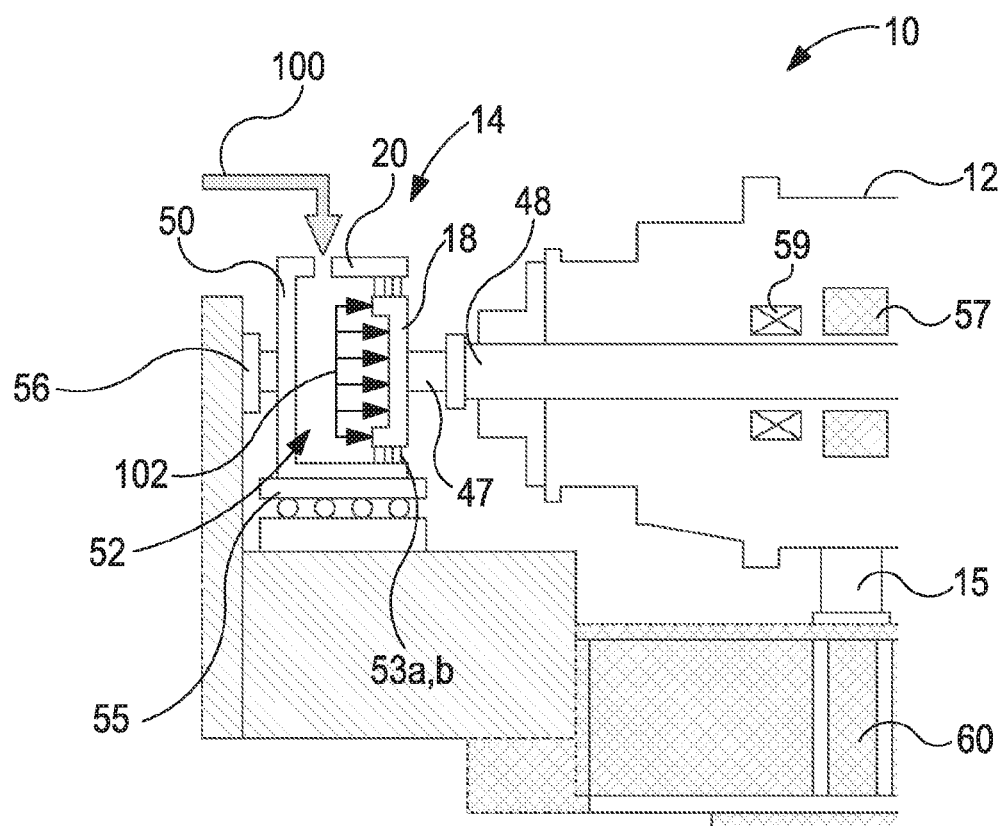
FIG. 4 illustrates a schematic sectional view of another exemplary turbomachine test stand, according to one or more aspects of the disclosure.

FIG. 4 illustrates a schematic sectional view of another exemplary turbomachine test stand 10, including the turbomachine housing 12 and the axial loading device 14. The exemplary turbomachine test stand 10 of FIG. 4 may be generally similar to the exemplary embodiments of the test stand 10 described above with reference to FIGS. 1-3, and may thus include the disk 18 coupled to the turbomachine shaft 48 via the quill shaft 47, with the disk 18 being received into the loading device housing 20. Furthermore, the pressurized region 52 may be defined between the disk 18 and the wall 50. As shown, the loading device housing 20 may be disposed on a ball or roller slide 55 and coupled to a load cell 56. The ball slide 55, which may instead be or additionally include any other suitably translatable device, allows at least axial translation of the loading device housing 20, while the load cell 56 may measure the axial force on the loading device housing 20. In various other exemplary embodiments, the loading support structure 16 (FIGS. 1 and 2) may be used in conjunction with the ball slide 55 and load cell 56.

As also shown in FIG. 4, the turbomachine shaft 48 may be supported by one or more magnetic bearings, for example, a magnetic bearing 57, during normal operation, with one or more auxiliary bearings, for example, an auxiliary bearing 59, provided to support the turbomachine shaft 48 during, for example, a drop. It will be appreciated that the positioning of the bearings 57, 59 is merely illustrative and may be reversed, and any number of rotors, blades, vanes, impellers, or the like (not shown) may be positioned on the turbomachine shaft 48 between the bearings 57, 59 and/or between either of the bearings 57, 59 and the disk 18.

With reference to FIGS. 1-4, in exemplary operation, axial loads on the turbomachine disposed in the turbomachine housing 12 may be tested using the axial loading device 14 while the turbomachine shaft 48 is rotating or stationary.

Accordingly, pressurized gas may be fed into the pressurized region 52 via the fluid inlet 54 (FIG. 3), as schematically illustrated by arrow 100 (FIG. 4). The pressurized gas may be fed into the pressurized region 52 during, after, and/or prior to operation of the turbomachine. During operation of the turbomachine, the disk 18, which is coupled or otherwise attached to the turbomachine shaft 48, may rotate with the turbomachine shaft 48. Furthermore, the disk 18 may remain in substantially the same axial and radial location, since the position of the turbomachine shaft 48 may be maintained by the magnetic bearing 57 (FIG. 4) and/or any other bearings. The position of the axial loading device 14, including the loading device housing 20, may also be constrained by the loading support structure 16 (FIGS. 1-3) and/or by the ball slide 55 and load cell 56 (FIG. 4). Furthermore, while the disk 18 and the loading device housing 20 may be free from physical contact, the seals 53a,b may be configured to slow the egress of the pressurized gas around the disk 18. Accordingly, a pressure may be applied to the disk 18, as illustrated by arrows 102 (FIG. 4), and an axial force generated by this pressure on the surface area of the disk 18 may be transmitted through the disk 18 and into the turbomachine shaft 48.

The axial load applied on the turbomachine shaft 48 may be proportional to the magnitude of the pressure of the pressurized gas in the pressurized region 52 multiplied by the surface area of the disk 18. As such, large axial loads may be employed for testing with relatively low pressure in the pressurized region 52, so long as a sufficient disk 18 surface area is provided. This may be desirable because high pressures in the pressurized region 52 may create radial loads on the disk 18 as the pressurized gas forces past the seals 53a,b. Furthermore, non-contacting seals such as seals 53a,b generally have a known leakage rate as a function of pressure; thus, at lower pressures, less pressurized gas is required to be provided into the pressurized region 52. In various exemplary embodiments, axial test loads applied to the disk 18 can span essentially any range of forces, for example, from less than ten pounds to forces exceeding 20,000 pounds.

As best shown in FIGS. 3 and 4, the disk 18 may be separated from the loading device housing 20, with the non-contacting seals 53a,b disposed therebetween. As such, physical contact between the disk 18 and the loading device housing 20 (specifically, the top 30 and the base 28 as shown in FIG. 3) may be avoided, at least while the turbomachine shaft 48 is supported by the magnetic bearing 57, i.e., during "normal operation" of the turbomachine. However, pressure may be applied on the disk 18 by the influx of pressurized gas via the fluid inlet 54, which provides a non-contacting or "floating" pneumatic piston. Furthermore, the floating pneumatic piston may avoid creating an additional connection to the ground, or a horizontal base 60 connected to the ground, supporting the turbomachine test stand 10 during normal operation.

With continuing reference to FIGS. 1-4, FIG. 5 illustrates a flow chart of an exemplary method 200 for testing the turbomachine by applying an axial load on the turbomachine shaft 48. The method 200 may begin by levitating and rotating the turbomachine shaft 48 and/or the quill shaft 47 using one or more magnetic bearings 57, as at 202. The magnetic bearing 57 may then be tuned, as at 204. Tuning processes are known in the art, and generally include, for example, establishing optimal values of system gain and phase margin, and accounting for resonant frequencies in the turbomachine support structure 15. For example, once a resonant frequency is determined, a band-pass filter may be provided so that a feedback control loop (not shown) controlling current to the magnetic bearing 57 is non-reactive to the resonant frequencies of the turbomachine support structure 15. Tuning the magnetic bearing 57 may also or instead include a variety of other processes for providing precision current responses to relative position changes between the turbomachine shaft 48 and the turbomachine support structure 15.

Once the magnetic bearing 57 is tuned, it being appreciated that additional tuning may be required after deployment and assembly of the turbomachine apart from the test stand 10, an axial load may be applied to the turbomachine shaft 48 to test the magnetic and/or auxiliary bearings 57, 59. For example, as indicated at 206, such axial loads on the turbomachine shaft 48 may be applied using the axial loading device 14, which is also referred to herein as the floating pneumatic piston, while the turbomachine shaft 48 is rotating or stationary. The method 200 may thus include inserting the disk 18 into the loading device housing 20 and increasing the pressure in the pressurized region 52 of the loading device housing 20 to, for example, between about 50 psi and 150 psi, as described above. It will be appreciated that other pressure ranges are within the scope of the disclosure, since the size of the disk 18 and the pressure applied can be calculated to approximate any desired axial loading magnitude on the turbomachine shaft 48. To maintain the pressure, the non-contacting seals 53a,b may be provided, which may circumscribe the disk 18 and may be disposed between the disk 18 and the loading device housing 20. It will be appreciated that increasing the pressure in the pressurized region 52 may push the disk 18 toward the turbomachine housing 12. Furthermore, the pressure in the pressurized region 52 may be decreased to provide a net pulling force on the turbomachine shaft 48, for example, once the magnetic bearing 57 have compensated for the pushing thrust.

After, during, and/or prior to applying the axial load at 206, the floating pneumatic piston may be calibrated, as at 208. In an exemplary embodiment, the calibration may be based on the calibration of the magnetic bearing 57. For example, a known axial load may be applied to the turbomachine shaft 48 while the turbomachine shaft 48 is stationary and levitated. The current supplied to the magnetic bearing 57 may then be increased or decreased so that the magnetic bearing 57 provides the necessary force to oppose the axial load and bring the net axial force to substantially zero. This may be repeated several times until the magnetic bearing 57 is calibrated for static loads. Subsequently, the axial loading device 14 may be coupled to the turbomachine shaft 48 and pressurized. The pressure and flow rate of the pressurized gas being provided into the pressurized region 52 may be measured, as may be the amount of current provided to the magnetic bearing 57 to resist the axial load provided by the pressure on the disk 18. With knowledge of the force-to-current relationship from the static axial loading calibration, the axial load provided by the axial loading device 14 may be calculated as a function of the pressure and flow rate of the pressurized gas.

The axial loading from the axial loading device 14 may instead or additionally be more directly calculated, using the ball slide 55 and load cell 56 shown in and described above with reference to FIG. 4. Accordingly, the pressurized gas may be provided to the loading device housing 20, with the axial position of the disk 18 generally constrained by the turbomachine support structure 15. Applying the pressure thus provides a force directed toward the load cell 56, with the ball slide 55 allowing the force to be transmitted to the load cell 56 in the form of measurable compressive loading.

Additionally, once the characteristics of the turbomachine test stand 10 are known, a drop may be simulated, as at 210. During a drop of the turbomachine shaft 48 of the turbomachine, in real-world situations, power to the magnetic bearing 57 may be cut off, or the magnetic bearing 57 may otherwise fail to maintain the levitation of the turbomachine shaft 48. The magnetic bearing 57 may thus drop the turbomachine shaft 48 onto the auxiliary bearing 59. Immediately after the drop, however, the full or near-full extent of the axial loading provided by other components coupled to the turbomachine shaft 48 may be applied to the auxiliary bearing 59. Accordingly, it is desirable to know whether, and how many times, the auxiliary bearing 59 may withstand a drop. Therefore, a drop may be simulated in the axially-loaded turbomachine test stand 10 by reducing or turning off current to the magnetic bearing 57 to de-levitate the turbomachine shaft 48 and drop it onto the auxiliary bearing 59. Subsequent to the de-levitation, the axial load may be briefly maintained and then removed, providing a test with the forces incident on the auxiliary bearing 59 as during a drop in substantially real-world conditions.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for testing a turbomachine, comprising:
   a loading device housing having an inner surface and a fluid inlet configured to receive a pressurized gas;
   a disk located outside of a turbomachine housing in which the turbomachine is disposed, the disk coupled to a shaft of the turbomachine, proximal an axial end of the shaft, and the disk received in the loading device housing and being axially moveable therein while the shaft is rotating; and
   a non-contacting seal disposed between the disk and the inner surface.

2. The apparatus of claim 1, further comprising a quill shaft extending from the axial end of the shaft and coupled to a face of the disk.

3. The apparatus of claim 1, wherein the seal circumscribes the disk and seals an open end of the loading device housing.

4. The apparatus of claim 1, further comprising a loading support structure coupled to the loading device housing and to the turbomachine housing.

5. The apparatus of claim 4, wherein the loading support structure comprises:
   a base coupled to and extending from the loading device housing; and
   two or more arms coupled to the base and extending axially therefrom to the turbomachine housing, the two or more arms being coupled to the turbomachine housing.

6. The apparatus of claim 5, wherein the two or more arms are disposed substantially parallel to a vertical center of the turbomachine housing.

7. The apparatus of claim 1, wherein the non-contacting seal comprises a labyrinth seal, a dry gas seal, or both and is coupled to the inner surface or the disk, while being free from contact with the other.

8. The apparatus of claim 1, wherein the pressurized gas has a pressure in the fluid inlet of from about 50 psi to about 150 psi.

9. The apparatus of claim 1, wherein the disk is free from physical contact with the loading device housing during a normal operation of the turbomachine.

10. A turbomachine test stand, comprising:
    a turbomachine including a turbomachine housing, a shaft extending at least partially through the turbomachine housing and outward therefrom, a magnetic bearing supporting the shaft during normal operation, and an auxiliary bearing configured to support the shaft during a drop;
    a loading device housing defining an interior;
    a disk coupled to the shaft, the disk being received in the interior of the loading device housing;
    a non-contacting seal disposed between the loading device housing and the disk and coupled to either the loading device housing or the disk; and
    a fluid inlet communicating with the interior of the loading device housing.

11. The turbomachine test stand of claim 10, further comprising a slide supporting the loading device housing and a load cell coupled to the loading device housing, wherein the load cell is configured to determine an axial load applied on the shaft by a pressurized gas interacting with the disk.

12. The turbomachine test stand of claim 10, wherein the disk is free from contact with the loading device housing while the shaft is supported by the magnetic bearing.

* * * * *